United States Patent [19]

Tompkins

[11] Patent Number: 5,292,472
[45] Date of Patent: Mar. 8, 1994

[54] COEXTRUSION APPARATUS AND METHOD WITH ROTATING CORD GUIDANCE

[75] Inventor: Dale A. Tompkins, Akron, Ohio

[73] Assignee: Bridgestone Corporation, Tokyo, Japan

[21] Appl. No.: 995,395

[22] Filed: Dec. 18, 1992

[51] Int. Cl.⁵ .................. B29C 47/02; B29C 47/20
[52] U.S. Cl. .................. 264/173; 156/117; 156/244.14; 264/174; 264/209.2; 264/312; 425/114; 425/133.1; 425/380; 425/462; 425/516
[58] Field of Search ........... 264/173, 172, 174, 209.2, 264/310, 150, 312, 103; 425/114, 113, 133.1, 462, 516, 380; 156/117, 244.14

[56] References Cited

U.S. PATENT DOCUMENTS

| | | | |
|---|---|---|---|
| 2,563,397 | 8/1951 | Colombo | 425/114 |
| 2,887,721 | 5/1959 | Blanchi et al. | 264/173 |
| 3,183,135 | 5/1965 | Berquist | 156/126 |
| 3,303,251 | 2/1967 | Heider et al. | 264/173 |
| 3,331,725 | 7/1967 | Mercer | 156/500 |
| 3,370,999 | 2/1968 | Schwarzrock | 156/244.14 |
| 3,697,209 | 10/1972 | Schlesser | 425/109 |
| 3,961,873 | 6/1976 | Brown | 425/380 |
| 4,060,361 | 11/1977 | Ziolko | 425/131.1 |
| 4,132,756 | 1/1979 | Ferrentino et al. | 264/174 |
| 4,135,869 | 1/1979 | Loyer | 425/71 |
| 4,293,294 | 10/1981 | Rasmussen | 425/112 |
| 4,362,488 | 12/1982 | Casals et al. | 425/380 |
| 4,472,126 | 9/1984 | Mitsui et al. | 425/114 |
| 4,490,316 | 12/1984 | Satzler | 264/40.7 |
| 4,578,024 | 3/1986 | Sicka et al. | 425/114 |
| 4,657,718 | 4/1987 | Sicka et al. | 264/146 |
| 4,790,737 | 12/1988 | Fukamachi et al. | 425/114 |
| 4,822,548 | 4/1989 | Hempel | 264/209.2 |
| 5,049,331 | 9/1991 | Hempel | 264/103 |
| 5,059,375 | 10/1991 | Lindsay | 264/167 |
| 5,062,782 | 11/1991 | Tompkins et al. | 264/172 |
| 5,069,850 | 12/1991 | Tompkins et al. | 425/462 |
| 5,108,682 | 4/1992 | Tompkins et al. | 425/462 |
| 5,128,084 | 7/1992 | Tompkins et al. | 425/462 |

FOREIGN PATENT DOCUMENTS 2050933A 1/1981 United Kingdom ............... 264/150

Primary Examiner—Jeffery Thurlow
Attorney, Agent, or Firm—David A. Thomas

[57] ABSTRACT

Coextrusion apparatus for forming tubular elastomeric ply made up of first, second and third concentric streams of elastomeric material and a pair of coaxial helical patterns of individual reinforcing elements wound in opposite direction with respect to each other contained within the first and third streams of elastomeric material and separated by the second stream of elastomeric material. A pair of reinforcing element guides are rotatably mounted within the apparatus between stationary flow channels for the three streams of elastomeric material, and are rotated in opposite directions with respect to each other. The two helical patterns of reinforcing elements and three streams of elastomeric material merge together substantially simultaneously in concentric circles which lie in a plane generally perpendicular to a central axis of the coextrusion apparatus to form the tubular ply. A method for producing such a reinforced tubular elastomeric ply also is presented.

16 Claims, 10 Drawing Sheets

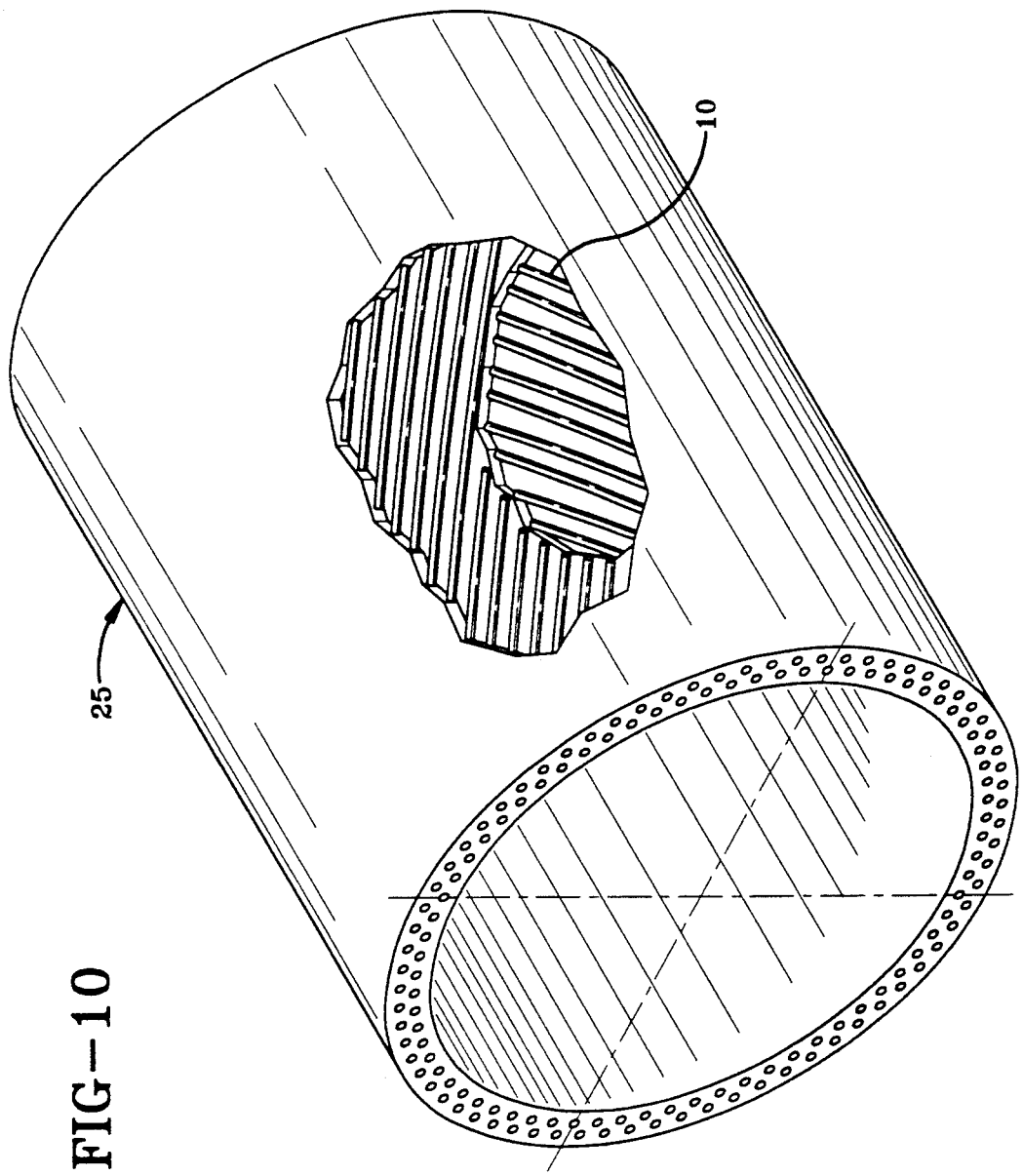

COEXTRUSION APPARATUS AND METHOD WITH ROTATING CORD GUIDANCE

BACKGROUND OF THE INVENTION

Technical Field

The field of art to which this invention pertains is that of a coextrusion apparatus and method, particularly for use in manufacturing annular seamless components of elastomeric material, such as used in the production of plies for pneumatic tires, air springs, reinforced hose or other reinforced tubular ply members. More particularly, the invention relates to such an apparatus and method for producing reinforced tubular plies wherein a high density of reinforcing elements are utilized with extreme accuracy in the spacing thereof, and wherein the reinforcing elements have a pair of helical arrangements covered by and separated by elastomeric layers.

Background Information

Tubular components or articles such as pneumatic tire body plies, air spring plies and the like, have been built previously by utilizing woven fabric and calendaring the same with rubber stock, which when cut to size, entails wrapping the sheet component around a building drum and overlapping the ends of the sheet to produce an annulus with a generally helical extending seam and internal parallel reinforcing cords arranged in a biased configuration. In order to avoid this lapped or seamed construction, extrusion has been employed in the prior art whereby a tubular extrudate is produced containing reinforcement cords.

Many of the problems with such lapped or seamed constructions have been resolved by the coextrusion apparatus and methods disclosed in U.S. Pat. Nos. 4,578,024 and 4,657,718, both of which are incorporated herein by reference in the interest of full disclosure. These earlier inventions provide a solution to the noted prior art problems by producing a generally tubular elastomeric ply or extrudate made up of first and second concentric tubular streams of elastomeric material having interposed adjacent their common interface, a closely and uniformly spaced array of parallel reinforcing elements. It is critical in many applications with which such reinforced tubular members are utilized, such as in pneumatic tires and air springs, which are subject to considerable movement and forces, that the individual reinforcing elements never come in contact with each other. Such contact can cause fatigue failure of the reinforcing element that may result in pin holes in the product which in turn could lead to subsequent loss of air and possible destruction of the product.

It is also desirable on many such tubular products to provide a high density of internal reinforcing elements to increase the strength of the tubular elastomeric ply, again without any individual reinforcing elements coming into contact with each other when embedded in the tubular extrudate. This high density of reinforcing elements is achieved by the use of helical arrays of reinforcing elements such as found in many high pressure hose constructions. However, in these hose constructions which are generally stationary during use, the contacting of the oppositely directed helical arrays of reinforcing elements is not critical since the hoses are not subject to continual movement resulting in abrading and possibly causing a pin hole effect at the point of contact between overlapping and contacting reinforcing elements.

It also is desirable that the individual layers which form the final extruded tubular extrudate be formed of different materials to achieve various results depending upon the particular application in which the tubular extrudate is to be utilized. For example, when used as a tire carcass or an air spring sleeve, it is desirable that the inner layer have a high fluid imperviousness, with the outer layer having a high abrasion resistance.

Thus, it is critical that the tubular extrudate is able to be extruded at an acceptable commercial rate, and that a pair of helical arrays of individual reinforcing elements are contained within the extrudate to provide reinforcement to the extrudate. It also is desirable that the extrudate has a high density of the reinforcing elements embedded therein, while maintaining the uniform and constant spacing between the individual elements without any contact therebetween, enabling the tubular extrudate to be used for the construction of pneumatic tires, air springs or similar components which are subject to constant movement during use.

It has been found that during the extruding of the tubular ply that it is critical that the counter rotating helical arrays of reinforcing elements and at least three layers of elastomeric material, merge together simultaneously at the extrusion orifice. This simultaneous merging ensures that the individual reinforcing elements maintain their intended spacing and that they are separated by the desired thickness of elastomeric material, in combination with inner and outer layers of uniform thicknesses of elastomeric materials.

Various prior art coextrusion apparatuses and methods have been devised for placing reinforcing elements or cords within a tubular extrudate, wherein the cords are arranged in counter rotating helical arrays as in the present invention. Some examples of such apparatus and methods are shown in certain of the following patents.

U.S. Pat. No. 3,183,135 discloses a method for extruding a tubular extrudate for use in the manufacture of tires having a plurality of parallel, longitudinally extending, reinforcing elements embedded therein.

U.S. Pat. No. 3,303,251 discloses tubular guide openings in mandrels leading to an extruder die. There is an inner mandrel and an outer mandrel which can be rotated in opposite directions, or one can be stationary and the other rotated, or both can be stationary. Drilled openings are provided within the mandrels to guide the reinforcements and to keep the reinforcements from becoming tangled or fouled as they move into the mandrels.

U.S. Pat. No. 3,331,725 discloses an apparatus for producing nets in which the reinforcing materials are fed through angled tubes for subsequent arrangement in a helical pattern.

U.S. Pat. No. 3,697,209 discloses the formation of plastic tubing wherein a layer of reinforcing material is placed over a first tubular stream of material, which is subsequently covered by another extruded layer of plastic, to form the reinforced tubular member.

U.S. Pat. No. 4,060,361 discloses a method and apparatus for rotating an outer and an inner extruder subassembly having oppositely arranged helical patterns of reinforcing members.

U.S. Pat. No. 4,132,756 discloses a process for producing reinforced elastomeric tubular material in which reinforcing elements are fed along grooves formed in one of the members in order to maintain a constant spacing between the reinforcing elements until merging into the elastomeric material.

U.S. Pat. No. 4,135,869 discloses an apparatus for forming a plurality of wires into continuous helical coils without entanglement of the wires, in combination with an extruder head for extruding a tube around the coils. Guide tubes are provided to prevent tangling of the wires during processing.

U.S. Pat. No. 4,293,294 discloses angled filament supply tubes used to supply filaments to a rotating mandrel so that they wind around the mandrel rather than flowing into intersecting extrusion flows. Furthermore, although the angles of the tubes are used to bias the filaments, they are not being biased relative to an extrudate flow.

U.S. Pat. No. 4,472,126 discloses an extruding apparatus for the manufacture of a reinforced hose. The apparatus comprises an inner tube extruder with an inner die and an outer tube extruder, in combination with an intermediate die and a further outer die. A spiral device having bobbins that carry the reinforcing thread is rotatably driven to deliver the reinforcement thread to thread holes which are spaced at regular intervals in a radial arrangement between the intermediate die and inner die.

U.S. Pat. No. 4,490,316 discloses a method and apparatus for the extrusion of a reinforced hose. The reinforcing member is manufactured by a braid forming machine, after which the reinforcement member will have elastic material extruded thereupon to form the reinforced hose.

U.S. Pat. No. 4,790,737 discloses an extruding apparatus for the manufacture of a reinforced hose. A spiral device is used to rotatably deliver reinforcement threads to a biaxial inner tube extruder and an outer tube extruder. The spiral device has a pair of bobbin carriers that hold a plurality of bobbins from which the thread will be delivered to inner and outer spinners.

U.S. Pat. No. 4,822,548 discloses a method and apparatus for extruding a reinforced rubber hose. A reinforcing thread is delivered to a rotating mold core whereupon elastomeric extrudate also is delivered to form the reinforced hose.

U.S. Pat. No. 5,049,331 discloses a method for producing thread reinforced extruded rubber wherein the threads are helically twisted into the finished rubber body.

U.S. Pat. No. 5,059,375 discloses a method and apparatus for forming reinforced tubing having a rotatable member with an extrusion passage for extruding thermoplastic material and a filament within another thermoplastic material, whereby the reinforcing filaments form a spiral or helical pattern in the wall of the tubing.

Although certain of the above referenced prior art patents show the extruding of a tubular product having oppositely wound helical arrays of reinforcing fibers embedded therein, the opposite array fibers are in contact with each other, and as indicated above, this may present a serious problem when the article in which the reinforced tubular extrudate is to be used, experiences constant motion, such as in pneumatic tires and air springs. Most importantly, none of these prior art patents show the joinder of at least three streams of elastomeric material simultaneously with two helical arrays of reinforcing cords so as to ensure the uniform constant spacing of the cords within the elastomeric material, which enables a high density of reinforcing cords to be utilized without any of the cords coming into contact with each other, as in the method and apparatus of the present invention.

SUMMARY OF THE INVENTION

An objective of the invention is providing a solution to the noted prior art problems in terms of apparatus and method by producing a generally tubular elastomeric extrudate having a pair of counter rotating helical arrays of reinforcing elements, wherein the elements have a uniform spacing throughout and are free of contact with adjacent reinforcing elements of the same helical array, and are out of contact with any of the elements from the oppositely rotated helical array of elements by an intervening layer of elastomeric material, in combination with an inner and outer layer of elastomeric material to produce such a tubular extrudate having a high density of reinforcing elements embedded therein.

A further objective of the invention is to provide such an extrusion apparatus and method in which the pair of helical arrays of reinforcing elements and the intervening layer of elastomeric material and the inner and outer layers of elastomeric materials, simultaneously merge together at the extrusion orifice to prevent distortion of the reinforcing elements which could result in undesirable contact therebetween.

Another objective of the invention is to provide such an apparatus and method in which the reinforcing elements are positively guided and trapped within individual guide grooves of the extruding apparatus as they move through the extrusion head until they exit the guides at the point where they are simultaneously joined with the streams of elastomeric materials in order to form a composite tubular member.

A still further objective of the invention is to provide such an apparatus and method in which the reinforcing elements are contained on a plurality of bobbins mounted on a pair of creels, which creels are counter rotated, in unison with the speed of the reinforcing element moving through the guides within the extruder head matching the extrusion speed, in order to provide a continuous constant tensioned movement of the reinforcing elements from their individual bobbins through the extrusion head and into the formed elastomeric tubular ply.

Another objective of the invention is to provide such a tubular reinforced ply which is free of usual weft cords present in woven fabrics, heretofore used for reinforcement in certain prior art extruded materials.

Still another objective of the invention is to provide such a method and apparatus in which the thickness of the tubular extrudate can be varied by varying the speed of the output of the individual extruders which supply the individual streams of elastomeric material to the extrusion head for subsequent simultaneous joinder with the pair of helical array of reinforcing elements.

A further objective of the invention is to provide such an apparatus and method in which the cord angulation of the helical array can be varied during extrusion by changing the speed of the rotating reinforcing element creels to achieve various characteristics in the final tubular extruded ply.

A still further objective of the invention is to provide such a coextrusion apparatus and method which is of a relatively rugged and durable construction, which can be easily disassembled for repair and maintenance, which can be used with commercially available extruders for receiving the supply of extrudate material, and in which the type of reinforcing elements incorporated therein can vary, depending upon the particular application in which the final product is used.

These objectives and advantages are obtained by the coextrusion apparatus of the invention the general nature of which may be stated as an apparatus having a central axis for producing a generally tubular elastomeric ply made up of at least first, second and third coaxial streams of elastomeric material which merge together at an annular extrusion orifice; said apparatus including stationary first channel forming means for forming an inner flow channel for delivering the first stream of elastomeric material to the extrusion orifice; stationary second channel forming means for forming an intermediate flow channel for delivering the second stream of elastomeric material to the extrusion orifice, said second channel forming means being located concentrically about said first channel forming means; stationary third channel forming means for forming an outer flow channel for delivering the third stream of elastomeric material to the extrusion orifice, said third channel forming means being located concentrically about said first and second channel forming means; an inner guide element rotatably mounted between the stationary first and second channel forming means for delivering a plurality of individual reinforcing elements in a first helical pattern to the annular extrusion orifice for introducing into the interface of the merging first and second streams of elastomeric material; an outer guide element rotatably mounted between the stationary second and third channel forming means for delivering a plurality of individual reinforcing elements in a second helical pattern in a direction opposite to the first helical pattern, to the annular extrusion orifice for introducing into the interface of the merging second and third streams of elastomeric material, with the second stream of elastomeric material separating the first and second helical patterns of reinforcing elements; means for rotating said inner and outer guide elements in opposite directions with respect to each other; and means for positioning discharge ends of the first, second and third channel forming means and discharge ends of the inner and outer guide elements at an imaginary circle which lies in a plane which extends generally transverse to the axis of the coextrusion apparatus, whereby said first, second and third streams of elastomeric material and the first and second pluralities of reinforcing elements substantially simultaneously merge together at the extrusion orifice.

These objectives and advantages are further obtained by the improved method of the invention the general nature of which may be stated as including a method for producing a generally tubular elastomeric ply including the steps of producing first, second and third annular tubular streams of elastomeric materials moving generally axially concentrically within an extrusion head toward an extrusion orifice; rotating first and second pluralities of individual reinforcing elements in opposite directions with respect to each other within the extrusion head to form two helical patterns of reinforcing elements; and substantially simultaneously merging the two helical patterns of reinforcing elements into the three streams of elastomeric materials at the extrusion orifice, with the second stream of elastomeric material separating the two helical patterns of reinforcing elements, and with the first and third streams of elastomeric material each coating a respective one of said helical patterns of reinforcing elements to form said tubular elastomeric ply.

BRIEF DESCRIPTION OF THE DRAWINGS

A preferred embodiment of the invention, illustrative of the best mode in which applicant has contemplated applying the principles of this invention, is set forth in the following description and is shown in the drawings and is particularly and distinctly pointed out and set forth in the appended claims.

FIG. 10 is an enlarged perspective view with portions broken away of the extrudate formed by the apparatus of the present invention; and FIG. 11 is a greatly enlarged fragmentary view of an end portion of the extrudate of FIG. 10.

Similar numerals refer to similar parts throughout the drawings.

DESCRIPTION OF THE PREFERRED EMBODIMENT

Figure 1:
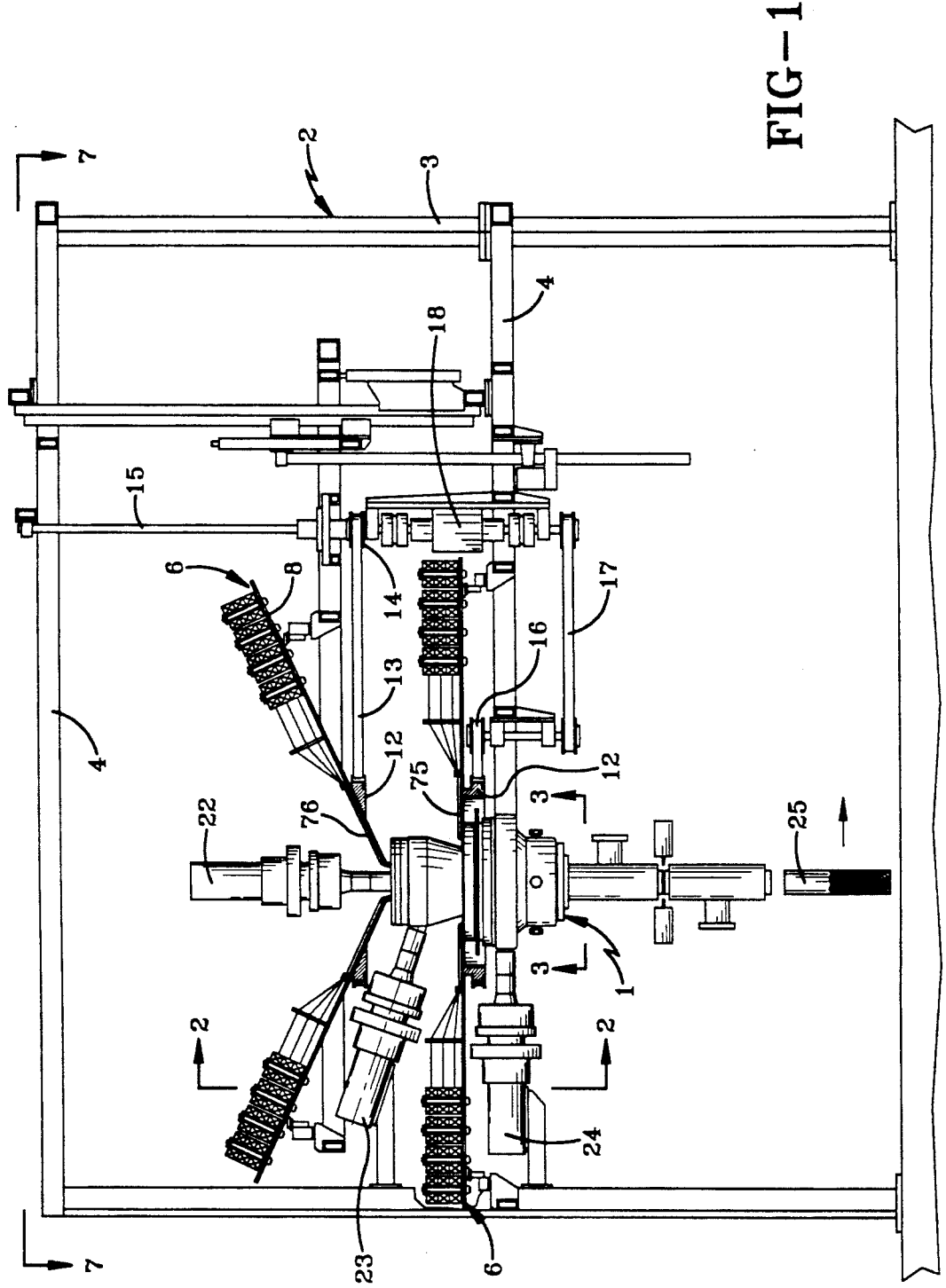
FIG. 1 is a generally diagrammatic elevational view of the elastomeric coextrusion apparatus with rotating cord guidance of the present invention in operating position.
Figure 2:
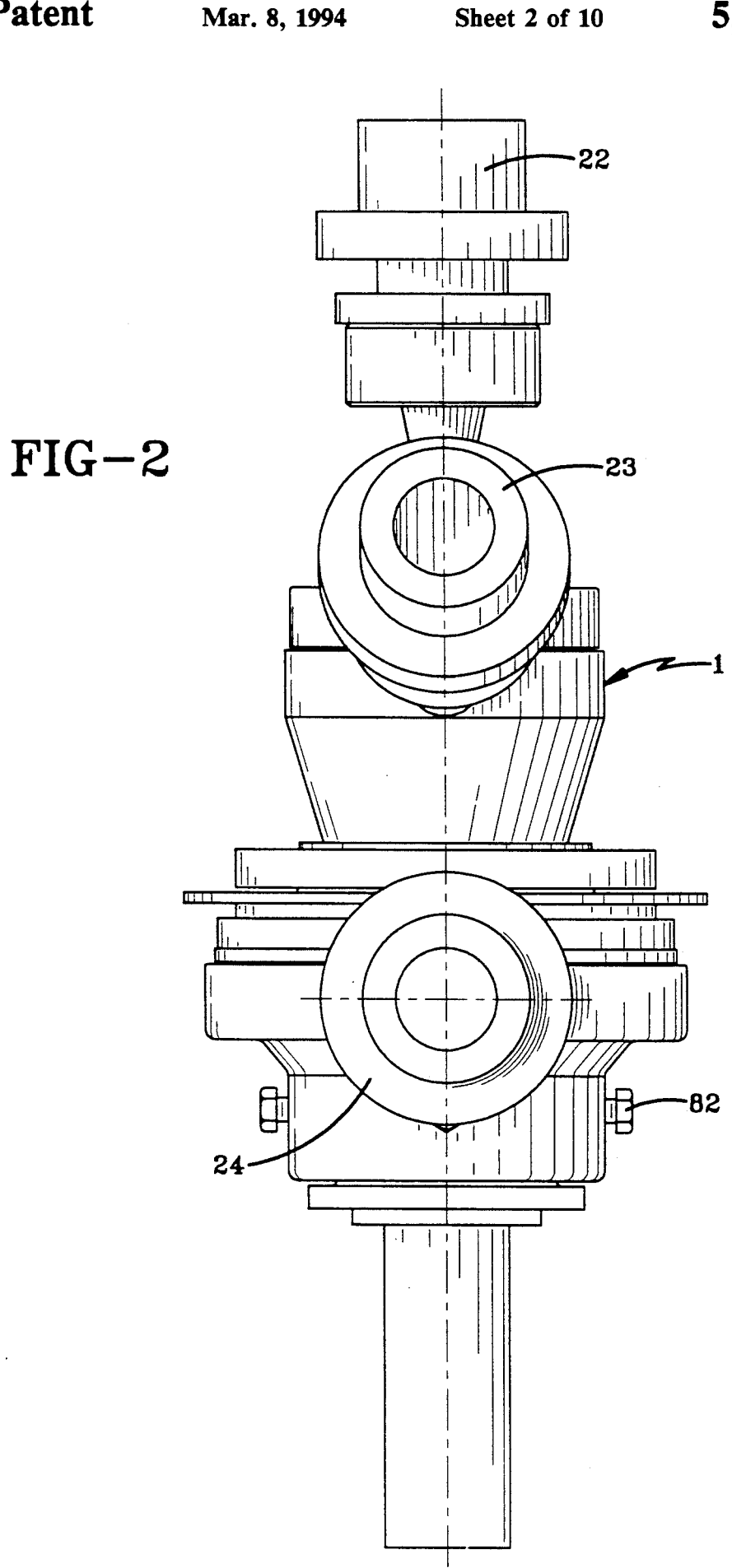
FIG. 2 is an enlarged elevational view looking in the general direction of arrows 2—2 of FIG. 1, with the rotating cord guidance assembly removed therefrom for the sake of clarity.
Figure 3:
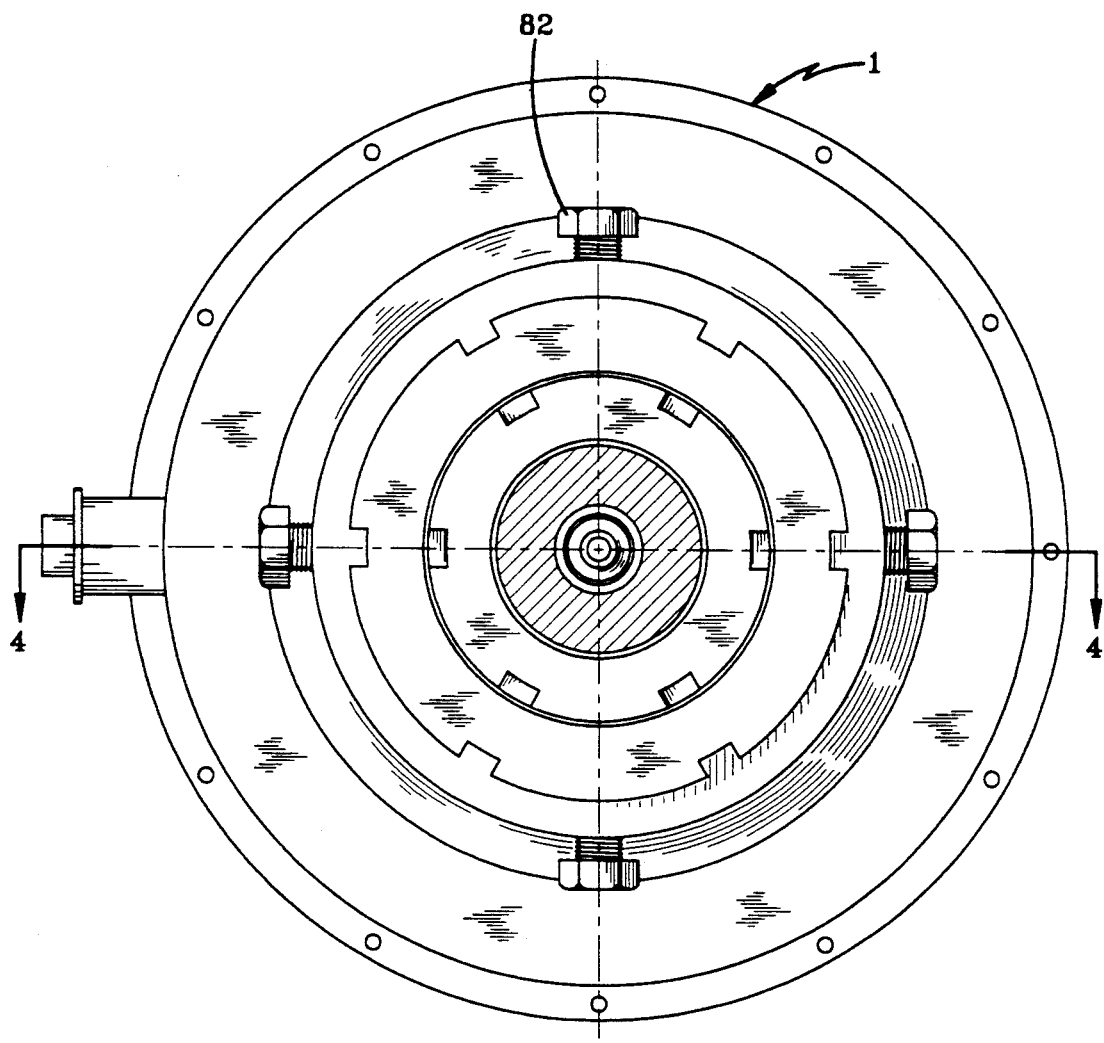
FIG. 3 is an enlarged sectional view taken on line 3—3, FIG. 1.
Figure 4:
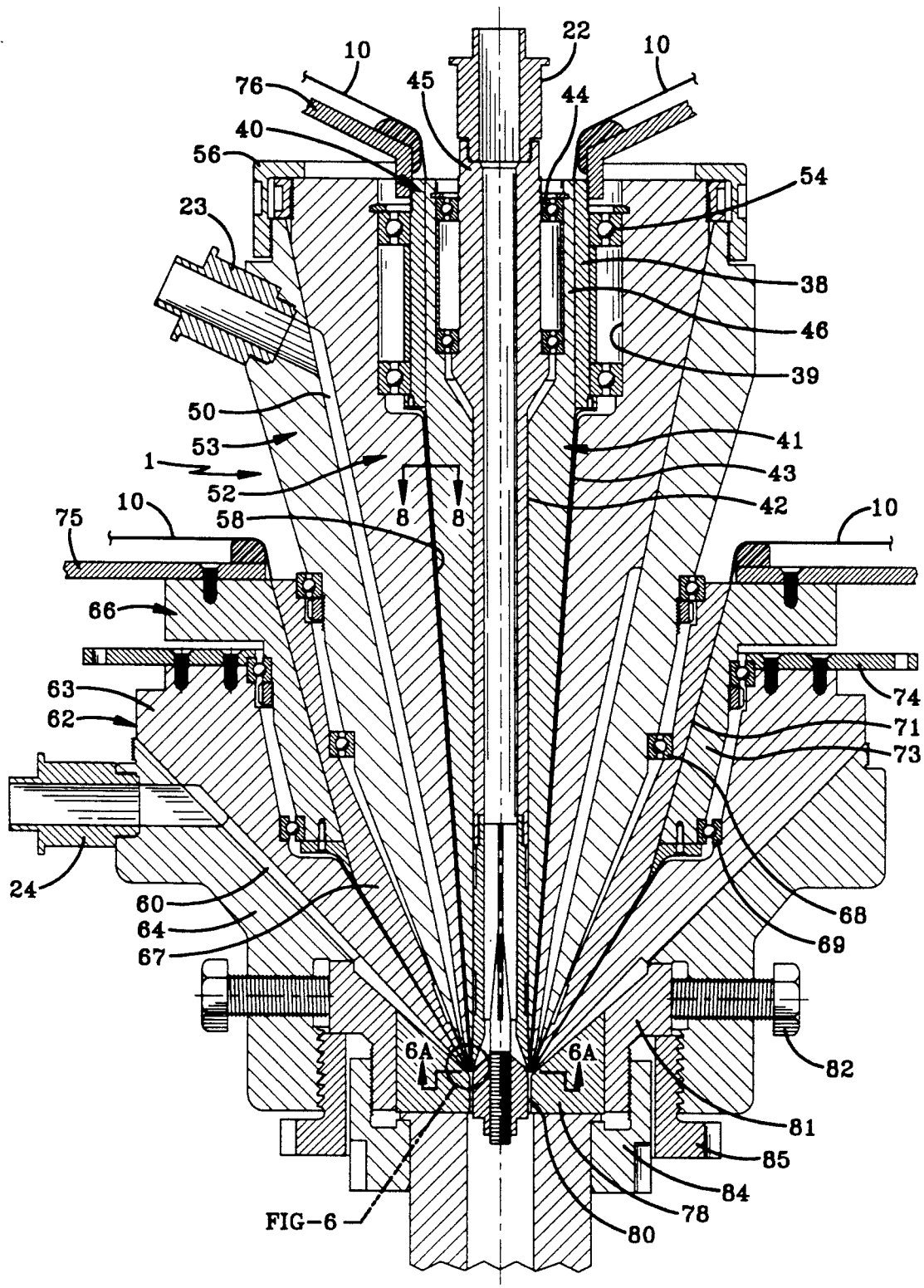
FIG. 4 is a sectional view taken on line 4—4, FIG. 3.
Figure 5:
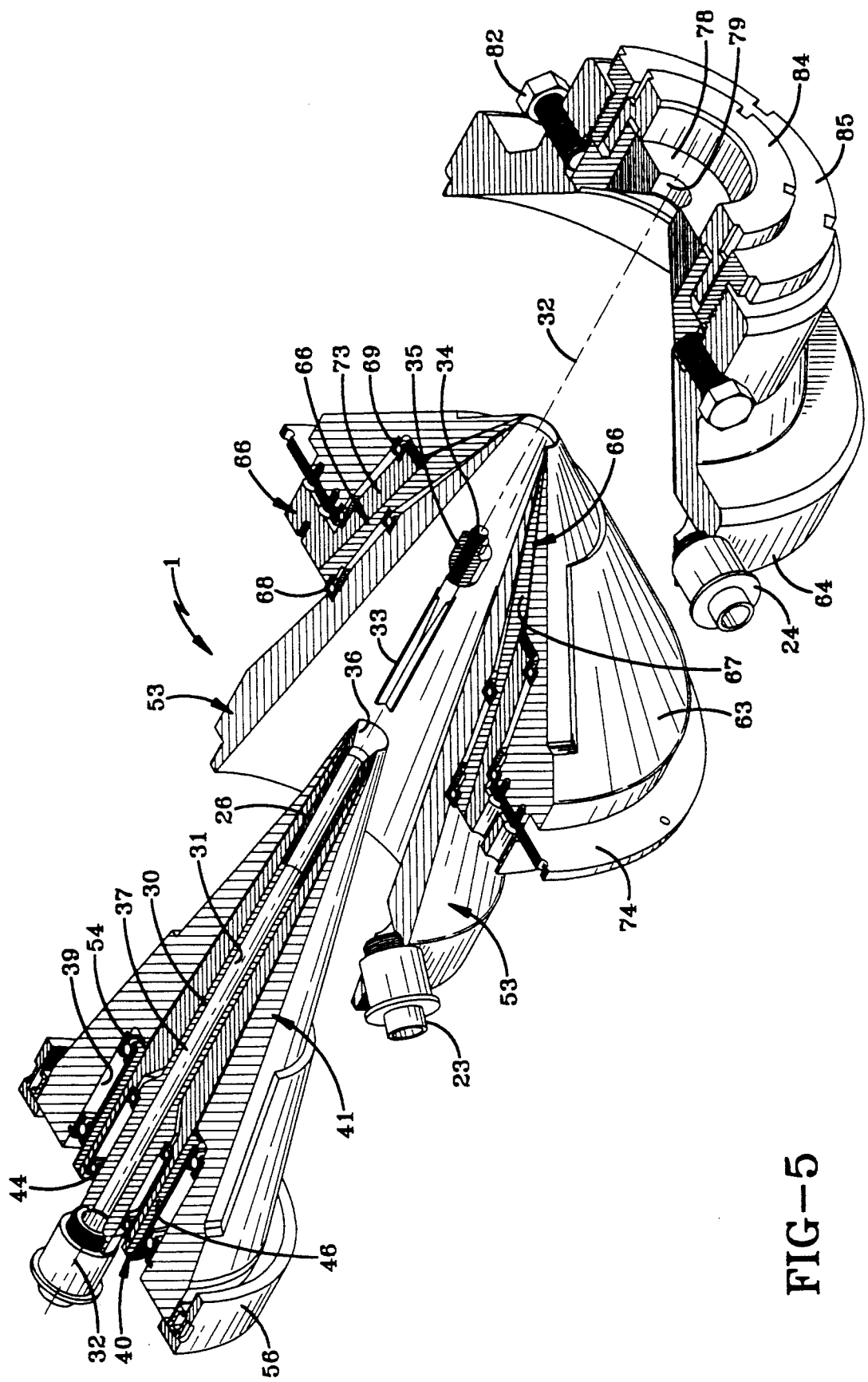
FIG. 5 is an enlarged exploded view with portions broken away and in section, of the extrusion head of FIG. 1.
Figure 7:
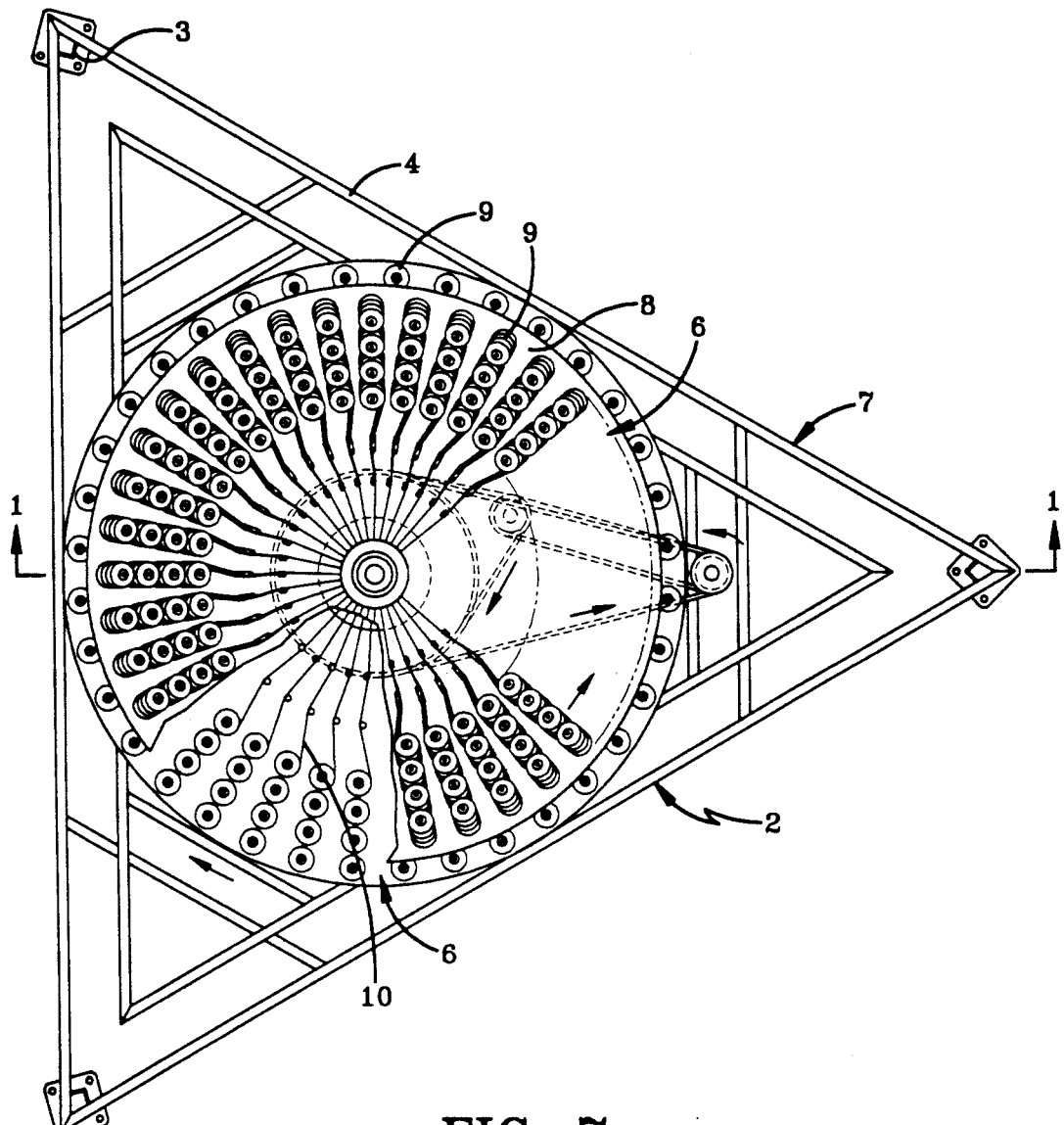
FIG. 7 is an enlarged plan view looking in the direction of arrows 7—7, FIG. 1.

FIG. 1 is a generally diagrammatic elevational view of the coextrusion apparatus and rotating cord guidance equipment of the present invention shown in assembled operating position. A coextrusion head indicated generally at 1, is mounted in a vertical arrangement within the rotating cord guidance equipment indicated generally at 2. Cord guidance equipment 2 includes a supporting frame consisting of a plurality of vertical frame members 3 and connected horizontal frame members 4. A pair of creels indicated generally at 6, one of which is shown particularly in FIG. 7, are rotatably mounted in a spaced relationship about extrusion head 1. Each creel 6 includes a frame indicated generally at 7, on which is mounted a table 8 containing a plurality of individual bobbins 9. Each bobbin 9 contains a length of a reinforcing cord or element 10.

Each creel 6 is rotatably supported by a drive member 12 (FIG. 1). Upper creel 6 is connected by a belt 13 to a pulley 14 of a drive shaft 15. Drive member 12 of lower creel 6 is rotated by a belt 16 which is connected to a second drive belt 17, which in turn is connected to shaft 15, all of which are rotated by a motor 18. Thus, the drive belts and associated pulleys are sized so that drive members 12 are rotated in unison, at a synchronous speed, for delivery of reinforcing cords 10 to extrusion head 1 as described in more detail below. The particular drive members 12 and the various drive belts, drive shaft and motor arrangement shown in FIG. 1, can vary without affecting the concept of the invention, and is illustrative of one type of drive means for rotating reinforcing cord creels 6 in opposite directions with respect to each other.

Figure 9:
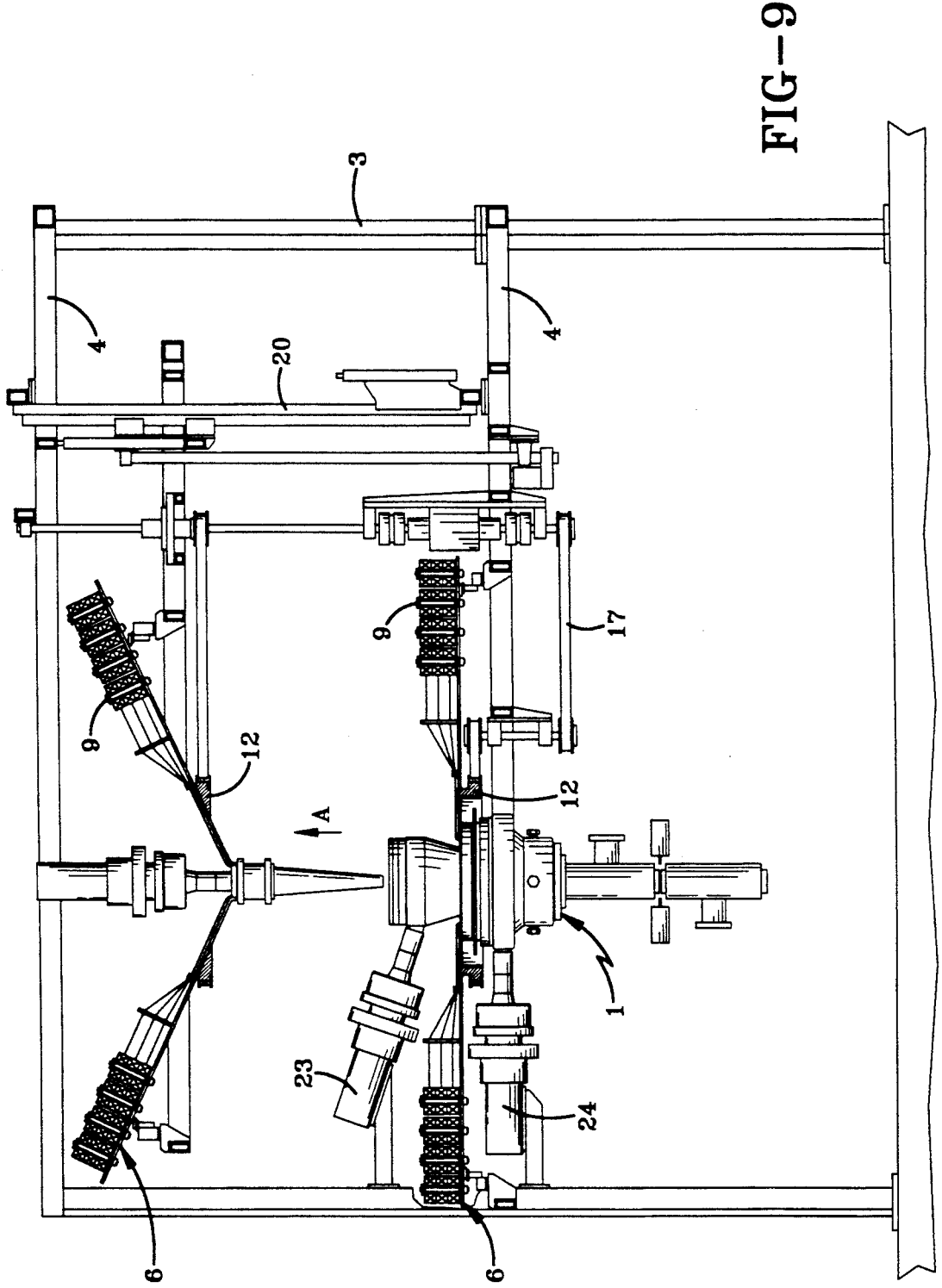
FIG. 9 is an elevational view similar to FIG. 1, with the coextrusion apparatus shown in partially disassembled position.

Referring to FIG. 9, upper creel 6 as well as some of the internal components of extrusion head 1, are mounted on slide rails 20 which enables the upper creel and sundry extrusion head components to be moved in the direction of arrow A to an open position for ease of maintenance and cleanout of extrusion head Again, the particular details of this opening mechanism, and in particular of slide rails 20, and the drive means therefore, can vary without affecting the concept of the invention.

As shown in FIG. 1, three independently controlled and operated extruders 22, 23 and 24 are connected to extruder head 1 for supplying three separate streams of elastomeric material into the extrusion head for subsequent formation of a reinforced tubular extrudate indicated at 25, part of which is broken away to show the opposite arrays of the internal reinforcing cord pattern.

Many features of extrusion head 1 are shown in U.S. Pat. Nos. 5,069,850, 5,108,682 and 4,578,024 which are also owned by the assignee of the present invention, the contents of which are incorporated herein by reference.

Referring particularly to FIGS. 2-5, extruder head 1 includes a central, axial hollow tube 30 (FIG. 5), having a through bore 31 which is coaxial to the central axis 32 of extrusion head 1, and which terminates in an outwardly flared end 36. A solid spider rod 33 extends coaxially through a front portion of tube bore 31 and is adjustably mounted therein by means well known in the art, for example by an insert sleeve 26, which forms the outer end of tube 30, having stepped portions into which the flared portions of spider rod 33 are seated. Rod 33 has a threaded end 34 on which is adjustably mounted a pin 35. Rod 33 forms an annular space within the interior front portion of tube 30, and in combination with the rear portion of tube bore 31 provides an inner flow channel 37 which communicates with the output of extruder 22 for delivering an annular stream of elastomeric material forwardly through extrusion head 1.

An inner guide element indicated generally at 40, is rotatably mounted concentrically about an enlarged cylindrical rear portion 45 of central tube 30. Guide element 40 includes an annular shell indicated generally at 41, which includes a generally hollow interior or bore, the majority of which is formed by a cylindrical inner surface 42 and a conical outer surface 43. Annular shell 41 is rotatably mounted about central tube 30 by rearwardly located first and second pairs of bearing rings 44 and 54. Bearing rings 44 are mounted between thickened rear portion 45 of central tube 30 and an axially extending rear portion 46 of annular shell 41. Bearing rings 54 are mounted between an outer cylindrical sleeve 38 mounted on rear portion 46 of shell 41 and an annular recess 39 formed in the rear portion of another concentric shell 52.

Outer conical surface 43 of inner guide annular shell 41 is formed with a spaced array of grooves 48 (FIG. 8) which are arranged in a spaced generally parallel arrangement along surface 43 converging toward the smaller end of shell 41. An extremely thin, generally conical shaped cover shell 49, extends about annular shell 41 to trap the individual reinforcement cords 10 in grooves 48 as shown particularly in FIG. 8. Cover shell 49 preferably extends nearly throughout the axial length of annular shell 41 to ensure that the individual reinforcing cords are maintained in their properly spaced arrangement in a trapped condition, preventing their tanglement with adjacent cords and associated components of extrusion head 1.

Extruder 23 communicates with an intermediate or second elastomeric material guide channel 50 which has an annular shape and converges toward the output end of extrusion head 1. Channel 50 is formed between concentrically positioned, telescopically joined, conical shaped inner and outer shells 52 and 53. The rear ends of inner and outer shells 52 and 53 are clamped in a fixed position with respect to each other, to the bearing rings, and to central tube 30, by an annular end clamping ring 56. Shells 52 and 53 thus form annular flow channel 50 which converges toward the output end of extrusion head 1.

A conical inner surface 58 of inner shell 52 forms a hollow bore 59 in which annular shell 41 of guide element 40 is freely rotatably mounted by bearing rings 44 and 54, with a very slight amount of clearance 47 (FIG. 8) being maintained between conical inner surface 58 and cord cover shell 49 of guide element shell 41. Space 47 eliminates or materially reduces any rotational friction between rotating guide element 40 and stationary shell 52.

A third or outer elastomeric material flow channel 60, which communicates with the output end of extruder 24, is formed in an outer housing indicated generally at 62, which is located toward the front or output end of extruder head 1. Housing 62 may be formed of a single annular member, or preferably is formed by an inner housing portion 63 and a separate mated outer housing portion 64.

Figure 8:
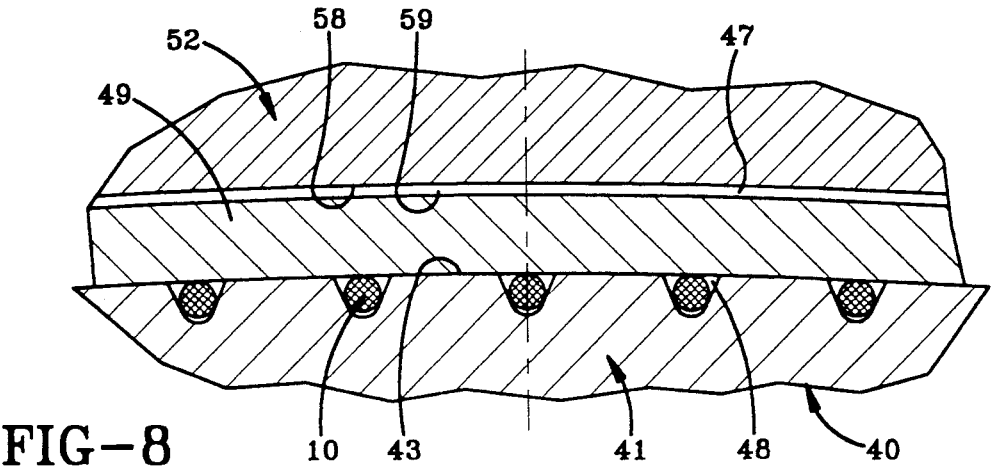
FIG. 8 is a greatly enlarged fragmentary sectional view taken on line 8—8, FIG. 4.

A second guide element indicated generally at 66, is rotatably mounted between inner portion 63 of housing 62 and outer shell 53 of the second channel forming members. Second guide element 66 includes an inner conical shell 67 which is rotatably mounted by two pairs of spaced bearing rings 68 and 69 located between outer shell 53 of the second channel forming members and inner housing portion 63 of outer housing 62. Outer surface 71 of guide element shell 67 is also formed with a series of axially extending spaced parallel grooves 48 such as shown in FIG. 8. The rear portions of the grooves are covered by a conical shaped cover plate 73. A thin cover plate (not shown) similar to plate 49 as shown in FIG. 8, is mounted on the converging front portion of shell 67 to trap reinforcing cords 10 in their respective grooves.

A support plate 74 is bolted to inner housing portion 63 for mounting extruder head 1 in the support frame as shown in FIG. 1. Drive members 12 are connected to the radially outwardly extending mounting flanges 75 at the rear of cover plate 73 for rotating second guide element 66 between inner shell 53 and outer housing 62. Plates 76 are attached to inner guide element 40 (FIG. 4), which are connected to upper creel 6 (FIG. 1) for rotating guide element 40 in an opposite direction to that of lower creel 6.

Thus, central tube 30, inner and outer shells 52 and 53, and outer housing 62 are fixedly mounted within the extrusion head, with inner guide element 40 and outer guide element 66 being rotatably mounted and driven between the respective fixed components of extruder head 1 as described above.

Referring again to FIGS. 3–5, an annular die ring 78 is formed with a central opening 79. Pin 35 is adjustably mounted in opening 79 and forms an annular extrusion orifice 80 between the smooth outer cylindrical surface of pin 35 and the cylindrical inner surface of die ring 78, which inner surface forms central opening 79. Die ring 78 is mounted in an outer hold ring 81 which is mounted within the outer end of housing 62 by bolts 82. Die ring 78 is further retained within hold ring 81 by an annular end clamping plate 84 and a clamping nut 85.

Figure 6:
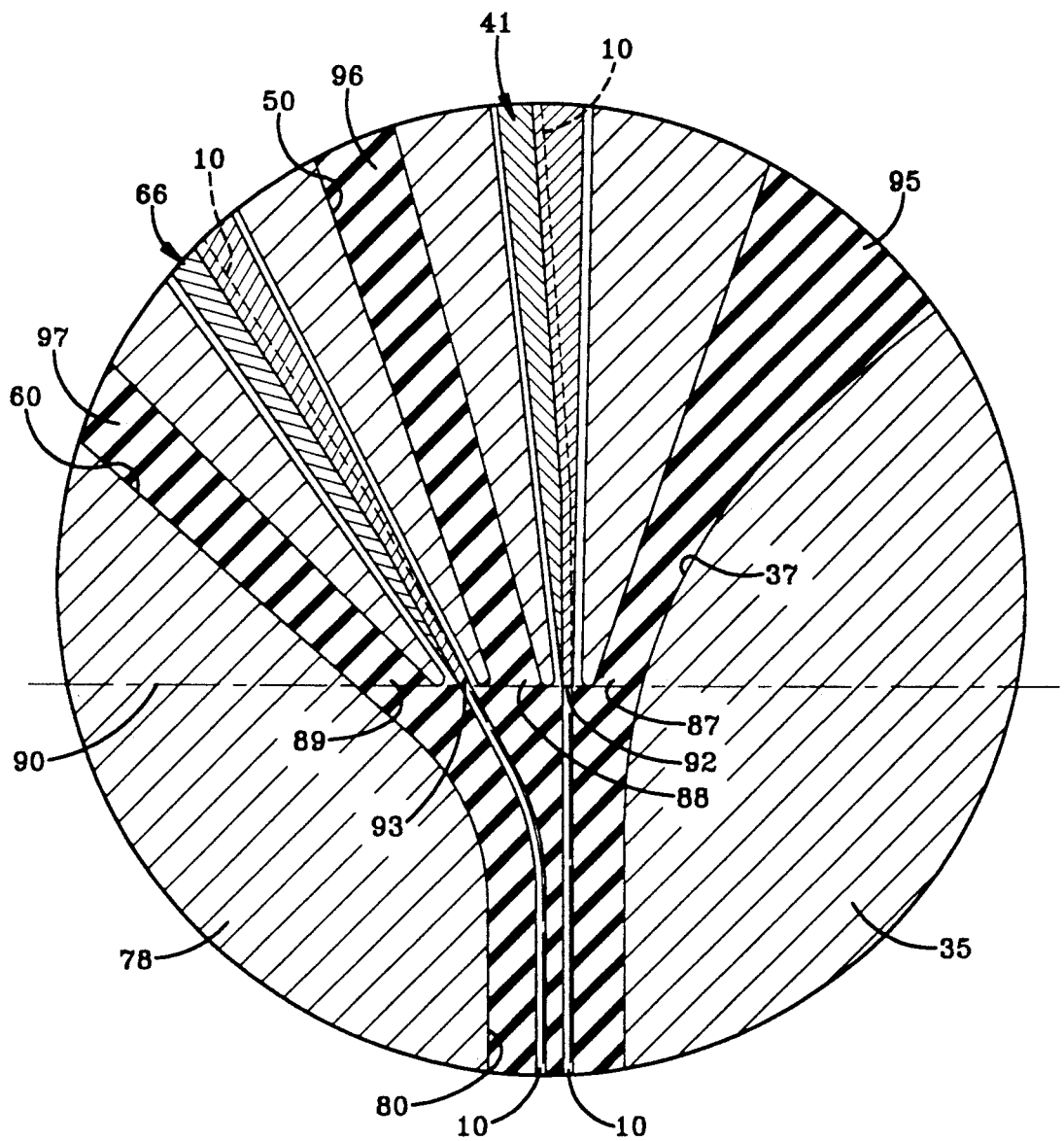
FIG. 6 is a greatly enlarged sectional view of the encircled area of FIG. 4.
Figure 6A:
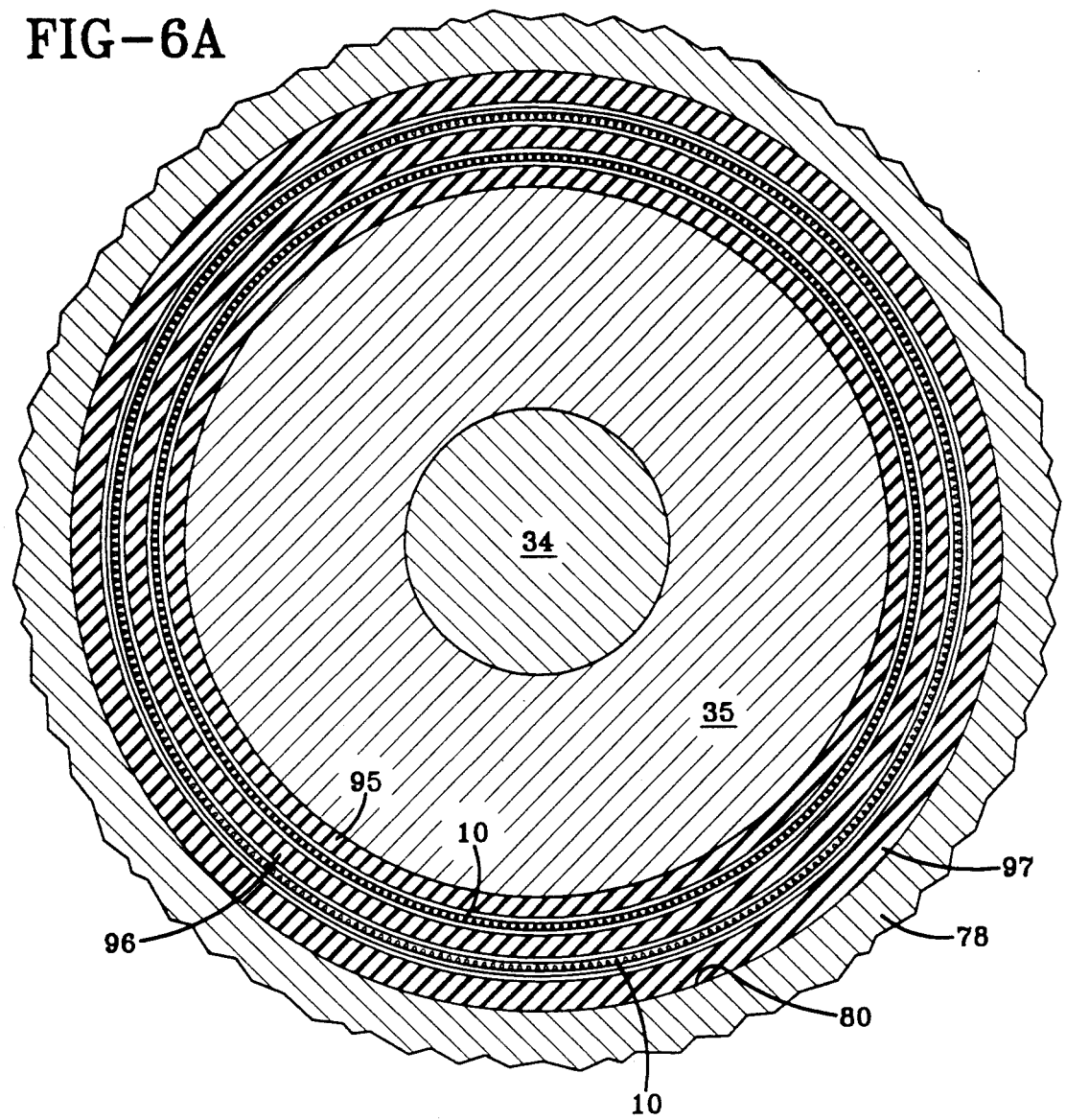
FIG. 6A is a greatly enlarged fragmentary sectional view taken on line 6A—6A, FIG. 4.

In accordance with one of the main features of the invention which is illustrated particularly in FIGS. 6 and 6A, the annular outlet or discharge end 87 of inner flow channel 37, the annular outlet or discharge end 88 of intermediate flow channel 50, and the annular outlet or discharge end 89 of outer flow channel 60, terminate in concentric circles which lie in a plane 90, perpendicular to central axis 32 of extruder head 1. Furthermore, the outlet or discharge end 92 of inner guide element 40, and the outlet or discharge end 93 of outer guide element 66, also terminate in concentric circles at or closely adjacent to, plane 90. Thus inner, intermediate and outer streams 95, 96 and 97 respectively, of elastomeric material which flow through channels 37, 50 and 60, respectively, merge into each other simultaneously at plane 90, and simultaneously merge with reinforcing cords 10 immediately as they leave discharge ends 92 and 93 of guide elements 40 and 66, respectively.

It is this simultaneous merger and joinder of the three streams of elastomeric material with the two arrays of reinforcing elements or cords which ensures that the reinforcing elements are evenly spaced and embedded within the three streams of elastomeric material, and most importantly are maintained out of contact with each other. Furthermore, the cords are maintained in their predetermined spacing and at a constant uniform tension, which is placed on the cords by the forwardly moving streams of extruded materials, when being embedded into the elastomeric material. This prevents any distortion of the cords when being embedded in the extruded elastomeric material, and most importantly prevents any contact between any of the adjacent reinforcing cords of the two spiral or helical arrays of cords due to the separation thereof by intermediate layer or stream 96 of elastomeric material.

This simultaneous joinder of the reinforcing cords with the elastomeric material provides extreme accuracy in placing the cords in the elastomeric material since the cords, most of which will be formed of twisted fibers, have a natural tendency to move as they leave the discharge ends of the guide elements. However, the simultaneous embedding of the cords in the elastomeric material immediately upon exiting the discharge ends of the guide elements, prevent this tendency of the cords to move, and ensures their accurate placement in the elastomeric material streams. The movement of the extrudate through the extrusion orifice will pull the reinforcing cords with a sufficient tension to maintain a constant tension thereon, again ensuring the accurate placement of the cords in the elastomeric material.

This simultaneous joinder of the three streams of elastomeric material, simultaneously with the two converging helical arrays of reinforcing cords, also minimizes the trapping of air in the joined streams of materials and cord interfaces, again reducing the possibility of problem spots occurring in the final extrudate. This accurate positioning of the cords in the elastomeric material enables a relatively high density of cords to be utilized which provides an extremely strong extruded product since the cords can be placed more closely together than heretofore possible, again without any of the cords coming into contact with each other. As indicated previously, such cord contact may provide an unsatisfactory condition, especially when the reinforced extrudate is intended for use in a moving product, such as an air spring or pneumatic tire.

As shown in FIG. 11, the preferred spacing 98 of the individual reinforcing cords of each helical array is between at least one, and two and one half times, the diameter 99 of the individual reinforcing cords. This provides an extremely concentrated amount of reinforcing cords within the extrudate, again without any contact therebetween, which is not believed to be achievable in prior art extrusion apparatuses and methods for producing such reinforced extruded products.

Although it is indicated that discharge ends 92 and 93 of guide elements 40 and 66, terminate at imaginary plane 90, they may terminate an extremely small distance behind the merger point of the elastomeric material at plane 90. For example, with a cord diameter of 0.01 inches the cord guides will terminate between 0.005 inches and 0.015 inches before plane 90.

The composition of elastomeric streams 95, 96 and 97 can be the same or can vary without affecting the concept of the invention. For example, inner stream 95 may be formed of a high fluid impervious material when used for an air spring or a pneumatic tire in order to maintain the air within the final product. Likewise, outer stream 97 which forms the outer covering of the air spring or tire carcass, preferably is formed of an elastomeric material having a high abrasion resistance.

FIG. 10 is an enlarged view with portions broken away and in section, showing the final reinforced extrudate 25. As shown diagrammatically therein, two helical arrays, each consisting of a plurality of individual reinforcing cords 10, are achieved by the simultaneous rotation of supply creels 6 and the rotation of inner and outer guide elements 40 and 66. In the embodiment shown in FIG. 10, the two helical arrays extend in opposite directions each having a 37° helix angle. Again, the individual cords of each array are maintained in a spaced relationship with each other by the elastomeric material, with the two arrays being maintained in a spaced relationship and out of contact with each other, primarily by intermediate elastomeric stream 96.

In accordance with another feature of the invention, it has been found that by regulating the speed of the individual extruders 22–24, that the thickness of the individual layers of elastomeric material when forming extrudate 25, can be varied without varying the size of extrusion orifice 80 or the total thickness of the tubular elastomeric ply. Furthermore, by varying the speed of rotation of creels 6 and the extrusion flow, the angle of the helix of the two arrays of reinforcing cords can be varied to provide the final extrudate 25 with various characteristics. For example, in an air spring application the angle or bias of the reinforcing cords, effect the spring characteristics.

Accordingly, the coextrusion apparatus and method with rotating cord guidance is simplified, provides an effective, safe, inexpensive, and efficient device which achieves all the enumerated objectives, provides for eliminating difficulties encountered with prior art devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coextrusion apparatus and method with rotating cord guidance is constructed and used, the characteristics of the construction, and the advantageous, new and useful results obtained; the new and useful structures, devices, elements, arrangements, parts and combinations, and method steps, are set forth in the appended claims.

I claim:

1. Coextrusion apparatus having a central axis for producing a generally tubular elastomeric ply made up of at least first, second and third coaxial streams of elastomeric material which merge together at an annular extrusion orifice; said apparatus including:
    a) stationary first channel forming means for forming an inner flow channel for delivering the first stream of elastomeric material to the extrusion orifice;
    b) stationary second channel forming means for forming an intermediate flow channel for delivering the second stream of elastomeric material to the extrusion orifice, said second channel forming means being located concentrically about said first channel forming means;
    c) stationary third channel forming means for forming an outer flow channel for delivering the third stream of elastomeric material to the extrusion orifice, said third channel forming means being located concentrically about said first and second channel forming means;
    d) an inner guide element rotatably mounted between the stationary first and second channel forming means for delivering a plurality of individual reinforcing elements in a first helical pattern to the annular extrusion orifice for introducing into the interface of the merging first and second streams of elastomeric material;
    e) an outer guide element rotatably mounted between the stationary second and third channel forming means for delivering a plurality of individual reinforcing elements in a second helical pattern opposed to the first helical pattern, to the annular extrusion orifice for introducing into the interface of the merging second and third streams of elastomeric material, with the second stream of elastomeric material separating the first and second helical patterns of reinforcing elements;
    f) means for rotating said inner and outer guide elements in opposite directions with respect to each other; and
    g) means for positioning discharge ends of the first, second and third channel forming means and discharge ends of the inner and outer guide elements, at an imaginary circle which lies in a plane which extends generally transverse to the axis of the coextrusion apparatus, whereby said first, second and third streams of elastomeric material and the first and second pluralities of reinforcing elements substantially simultaneously merge together at the extrusion orifice.

2. The coextrusion apparatus as defined in claim 1 in which the first channel forming means includes an annular hollow tube extending generally coaxial through the extrusion apparatus and terminating in an outwardly flared discharge end; and in which a pin is adjustably mounted within the flared end of the hollow tube forming an annular flow passage therebetween.

3. The coextrusion apparatus defined in claim 2 including a die ring having a die opening formed therethrough; and in which the pin is mounted within the die opening to form the annular extrusion orifice between an outer annular surface of the pin and an inner annular surface of the die ring.

4. The coextrusion apparatus defined in claim 1 in which the second channel forming means includes spaced inner and outer conical shells telescopically joined together with the intermediate flow channel being formed therebetween.

5. The coextrusion apparatus defined in claim 4 in which the inner guide element includes a hollow shell having a central bore and an outer annular surface; in which the first channel forming means includes an annular hollow tube mounted within the central bore of the guide element hollow shell; and in which bearing means is mounted between said hollow shell and the tube of the first channel forming means, and between said hollow shell and the inner shell of the second channel forming means for rotatably mounting said hollow shell between said tube and said inner shell.

6. The coextrusion apparatus defined in claim 5 in which the outer annular surface of the hollow shell of the inner guide element is conical and is formed with an array of generally axially extending grooves for receiving the reinforcing elements therein; and in which a cover shell traps the reinforcing elements within the grooves.

7. The coextrusion apparatus defined in claim 5 in which the third channel forming means includes a stationary outer housing with the outer flow channel formed therein; and in which bearing means is mounted between said stationary outer housing and the outer guide element and between the outer conical shell of the second channel forming means and said outer guide element, for rotatably mounting said outer guide element between the second and third channel forming means.

8. The coextrusion apparatus defined in claim 1 in which the spacing between the individual reinforcing elements at the extrusion orifice is within the range of between 1 and 2.5 times the diameter of each of said reinforcing elements.

9. The coextrusion apparatus defined in claim 1 in which the individual reinforcing elements are wound on individual spools, said spools being supported on a pair of creels; and in which power drive means is operatively connected to said creels for rotating said creels in synchronization with the rotation of the means for rotating the inner and outer guide elements.

10. A method of producing a generally tubular elastomeric ply including the steps of:
    providing three separate extruders;
    producing first, second and third annular streams of elastomeric materials, one stream from each of said extruders, said streams moving generally axially concentrically within an extrusion head toward an extrusion orifice;

rotating first and second pluralities of individual reinforcing elements in opposite directions with respect to each other within the extrusion head to form two helical patterns of said reinforcing elements; and substantially simultaneously merging the two helical patterns of reinforcing elements into the three streams of elastomeric materials at the extrusion orifice with the second stream of elastomeric material separating the two helical patterns of reinforcing elements, and with the first and third streams of elastomeric material each coating a respective one of said helical patterns of reinforcing elements to form said tubular elastomeric ply.

11. The method defined in claim 10 including moving the first stream of elastomeric material along an axial centerline of the extrusion head; and moving the second and third streams of elastomeric material in a converging direction toward the extrusion orifice.

12. The method defined in claim 10 including maintaining the spacing between the individual reinforcing elements at the extrusion orifice to between 1 and 2.5 times the diameter of each of said reinforcing elements.

13. The method defined in claim 10 including positively maintaining the reinforcing elements in a generally parallel spaced relationship out of contact with each other as they are rotated within the extrusion head.

14. The method defined in claim 10 including varying the extrusion rate of the three extruders to vary the relative thicknesses of the elastomeric plies without varying the size of the extrusion orifice or total thickness of the tubular elastomeric ply.

15. The method defined in claim 10 including forming one of the streams of elastomeric materials of a greater fluid imperviousness material than that of the other two streams.

16. The method defined in claim 10 including forming one of the streams of elastomeric materials of a greater abrasion resistance material than that of the other two streams.

* * * * *